United States Patent
Kovega et al.

(10) Patent No.: US 10,454,960 B2
(45) Date of Patent: Oct. 22, 2019

(54) METHOD OF AND SYSTEM FOR USER AUTHENTICATION IN ELECTRONIC SERVICE FOR TRANSMISSION OF DIGITAL OBJECTS

(71) Applicant: YANDEX EUROPE AG, Lucerne (CH)

(72) Inventors: Dmitriy Nikolaevich Kovega, Mytishchi (RU); Ekaterina Aleksandrovna Kovega, Mytishchi (RU)

(73) Assignee: YANDEX EUROPE AG, Lucerne (CN)

( * ) Notice: Subject to any disclaimer, the term of this patent is extended or adjusted under 35 U.S.C. 154(b) by 231 days.

(21) Appl. No.: 15/699,050

(22) Filed: Sep. 8, 2017

(65) Prior Publication Data

US 2018/0077185 A1  Mar. 15, 2018

(30) Foreign Application Priority Data

Sep. 13, 2016 (RU) .................................. 2016136719

(51) Int. Cl.
  *G06F 15/16* (2006.01)
  *H04L 29/06* (2006.01)
  (Continued)

(52) U.S. Cl.
  CPC .......... *H04L 63/1425* (2013.01); *G06F 3/048* (2013.01); *G06Q 10/107* (2013.01); *H04L 63/1483* (2013.01); *H04L 67/22* (2013.01)

(58) Field of Classification Search
  None
  See application file for complete search history.

(56) References Cited

U.S. PATENT DOCUMENTS 9,076,008 B1  7/2015 Moy
2006/0143273 A1  6/2006 Chao et al.
(Continued)

FOREIGN PATENT DOCUMENTS

CN  104348626 A  2/2015

OTHER PUBLICATIONS

English Abstract of CN104348626 retrieved on Espacenet on Jun. 13, 2017.
(Continued)

*Primary Examiner* — Mohamed Ibrahim
(74) *Attorney, Agent, or Firm* — BCF LLP

(57) ABSTRACT

A method of and a system for user authentication in an electronic service for transmitting digital objects, the electronic service accessible by a client device via a client application, the client application associated with at least one native network protocol. The method includes receiving a request for access to a user profile in the electronic service, including user account data and at least one user behavior parameter; responsive to at least one user behavior parameter being different from the user behavior parameters stored in the user profile, creating a digital object with an indication of a verification routine; transmitting the digital object via the native network protocol to the client application, the digital object configured to cause the client device to perform the verification routine via at least one non-native network protocol; responsive to the verification routine rendering a positive outcome, granting access to the user profile.

17 Claims, 3 Drawing Sheets

(51) Int. Cl.
G06F 3/048 (2013.01)
G06Q 10/10 (2012.01)
H04L 29/08 (2006.01)

(56) References Cited

U.S. PATENT DOCUMENTS

| | | | |
|---|---|---|---|
| 2007/0244973 A1 | 10/2007 | Pearson | |
| 2011/0047608 A1* | 2/2011 | Levenberg | H04L 63/0807 |
| | | | 726/7 |
| 2011/0059727 A1* | 3/2011 | Lisboa | H04W 4/00 |
| | | | 455/414.1 |
| 2012/0331536 A1* | 12/2012 | Chabbewal | G06F 21/33 |
| | | | 726/7 |
| 2016/0021116 A1* | 1/2016 | Maguire | H04L 63/102 |
| | | | 726/4 |
| 2016/0065558 A1* | 3/2016 | Suresh | H04L 63/08 |
| | | | 726/7 |

OTHER PUBLICATIONS

"About two-step verification", MICROSOFT, https://support.microsoft.com/en-us/help/12408/microsoft-account-about-two-step-verification, accessed on Jun. 13, 2017, 3 pages.

* cited by examiner

METHOD OF AND SYSTEM FOR USER AUTHENTICATION IN ELECTRONIC SERVICE FOR TRANSMISSION OF DIGITAL OBJECTS

CROSS-REFERENCE

The present application claims priority to Russian Patent Application No. 2016136719, filed Sep. 13, 2016, entitled "Method Of And System For User Authentication In Electronic Service For Transmission Of Digital Objects" the entirety of which is incorporated herein.

FIELD OF THE TECHNOLOGY

The present technology relates to methods of and systems for processing user access to an electronic service, and, specifically, to methods of and systems for user authentication in the electronic service for transmission of electronic objects.

BACKGROUND

Today, a typical user of an electronic device enjoys access to a variety of applications, each aiming to help such user to solve a particular task. For instance, an email application allows users to send and receive emails, both of a business and personal nature. A web browser allows users to search the Internet for resources meeting their needs, the searches being of a business and a personal nature.

A typical service provider offers users a variety of electronic services (e-services) to transmit digital objects. These electronic services include: emails, digital filed for cloud-based storage thereof, and instant messaging services.

A variety of electronic devices (including, inter alia, desktops, laptops, wireless communication devices, smart TVs, etc.) are available to users. Most such devices are capable of being connected to the Internet, which helps users solve one or more tasks through the Internet access and search for resources aimed at assisting users to solve such tasks. Unfortunately, various malicious users exploit the popularity of Internet-connected electronic devices to attain their own objectives.

For instance, such individuals and even entities hack various user accounts and use them, in particular, to gain access to user confidential data, in order to send malicious email messages (known as 'Spam'), etc.

A number of techniques are used to prevent unauthorized access to a user account. One such techniques is the creation of a user profile that includes an indication of the "user environment" (the user behavior parameters) employed by the user to access a service. Examples of a user's behavior that make up such the user environment include, inter alia, the user's geolocation, IP address, browser version, operating system, etc. If a user is trying to gain access to the electronic service with a behavior parameter that do not match the typical user environment associated with the user profile (for example, a log in attempt being originated from a location different from that stored in the user profile), then the electronic service will execute an additional user verification routine. Such additional user verification routine can include a request to enter the phone number associated with the user profile, request to provide the answer to another security question or, for example, sending an SMS to the mobile phone number with the request to enter the code from such SMS in order to gain access to the electronic service.

Various verification routines are known for use implemented with the existing web interfaces of electronic services for transmission of digital objects. However, many electronic services for transmission of digital objects are available to the user through a client application, i.e. a dedicated application ("app") for accessing one or more electronic services for transmission of digital objects. For instance, a user can gain access to the Gmail™ email service via a browser application (Microsoft™ IE, Mozilla Firefox™, Safari™, Google™ Chrome™, Yandex.Browser™, etc.) through the https://mail.google.com web interface. A user can also gain access to the Gmail™ email service via a client application (Microsoft Outlook™, Mozilla Thunderbird™, The Bat!) using at least one native network protocol to send and receive emails (for example, POP3, or SMTP, or IMAP). Where a user accesses his/her email via a client application, the existing technical solutions take no account of any parameter of such user behavior, whereas the client application does not require sending or performing any verification routine, which makes it possible for an unauthorized user to gain access to the user profile.

Similarly, the above considerations may apply to other electronic services for transmission of digital objects, including, but not limited to, instant messaging and personal cloud storage services.

Chinese Patent No. CN 104348626 (published on 11 Feb. 2015) discloses an application method for a digital certificate and relates to the field of network communication. The method comprises the following steps of transmitting a digital certificate application request to a server according to received trigger operation after receiving email account information inputted by a user from an email client, and further informing the server of transmitting a digital certificate verification email; after receiving the digital certificate verification email by the email client, recognizing the digital certificate verification email and extracting verifying information from the digital certificate verification email; acquiring the digital certificate corresponding to the verification information from the server according to the verification information; after acquiring the digital certificate from the server, automatically installing the digital certificate. According to the application method disclosed by the invention, the problem that the certificate can be installed by a huge volume of operations in a browser and a system by the user is solved, and the beneficial effects that the digital certificate can be installed by reducing the operations of the user and improving the user experience are achieved.

US patent application No. US20070244973 (published on 18 Oct. 2007) discloses a system for sending an email through a web based email provider while using a web application includes a web application server and a web based email application server. The web application server displays a web page at a client having at least one selectable link, receives an instruction from the client requesting an email through selection of the selectable link, creates a redirect message for accessing the web based email provider, and sends the redirect message to the client. The web based email application server receives the redirect message, displays an email composition web page at the client, receives a completed email from the client, and sends the completed email to an email server for delivery.

SUMMARY

It is an object of the present technology to expand a pool of the aforementioned techniques and offer new methods of and systems for user authentication in an electronic service for transmission of digital objects. Also, the technology, in some of its implementations, helps rectify a number of deficiencies present in the prior art.

In the context of the present specification, unless otherwise expressly provided, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the term a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request, associated with a client device; and all of this software and hardware may be one server or multiple servers, both cases are included within the expression "at least one server".

In the context of the present specification, an "electronic device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless otherwise expressly provided, an "indication of" an information element may be the digital object itself or a pointer, reference, link, or another indirect mechanism enabling the recipient of the indication to locate a network, memory, database, or other computer-readable memory location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood, prior to data transmission between a sender and a recipient, that an indication of the information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless otherwise expressly provided, the term "information" includes information of any nature or kind whatsoever capable of being stored in a database. Thus, information includes, but is not limited to, audiovisual works (images, movies, sound records, presentations etc.), data (location data, numerical data, user names, passwords, email addresses, etc.), text (opinions, comments, questions, messages, etc.), documents, spreadsheets, etc.

In the context of the present specification, unless otherwise specifically provided, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless otherwise expressly provided, the term "module" is meant to include software (appropriate to a particular hardware context) that is both necessary and sufficient to achieve the specific function(s) being referenced.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the servers, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless otherwise specifically provided, a browser application may include a software application running on a client device used to retrieve, provide and browse various information resources, and specifically, web interfaces of electronic services for transmission of digital objects. A browser application may be a standalone application or part of another application that allows for browsing web content on a client device.

In the context of the present specification, unless otherwise expressly provided, a client application (a "client") may be a software application running on a client device designed for accessing a particular type of an electronic service for transmission of digital objects through at least one native network protocol. Non-limiting examples of client applications of electronic services for transmission of digital objects are: email applications (for example, Microsoft Outlook™, Mozilla Thunderbird™, and The Bat!™), instant messaging applications (Google Talk, ICQ, and WhatsApp), personal cloud storage applications (Microsoft OneDrive, Dropbox, and Yandex.Disk).

In the context of the present specification, unless otherwise expressly provided a native network protocol means one or more network protocols used by a client application to transmit and/or receive digital objects. Non-limiting examples of native protocols are: POP3, SMTP, and IMAP—for email applications; XMPP—for instant messaging applications, and WebDav, FTP, SSH, RSync, SCP, SFTP, and FTPS—for personal cloud storage applications.

In the context of the present specification, unless otherwise expressly provided a non-native network protocol means any other protocol that is not used and is not usable by the client application for purposes of exchanging digital objects with an electronic service for transmission of digital objects or any protocol that is not used by a client application in principle. Non-native protocols can also be supported by a client device for purposes of performing other tasks, or require triggering a different application, for example, a browser application installed on a client device. In the context of the present specification, non-limiting examples of non-native protocols are the HTTP and HTTPS network protocols.

Additional and/or alternative features, aspects, and advantages of embodiments of the present disclosure will become apparent from the following description, the accompanying drawings, and the appended claims.

BRIEF DESCRIPTION OF THE DRAWINGS

For a better understanding of the present technology, as well as other aspects and further features hereof, reference is made to the following description which is to be used in conjunction with the accompanying drawings, where.

DETAILED DESCRIPTION

Figure 1:
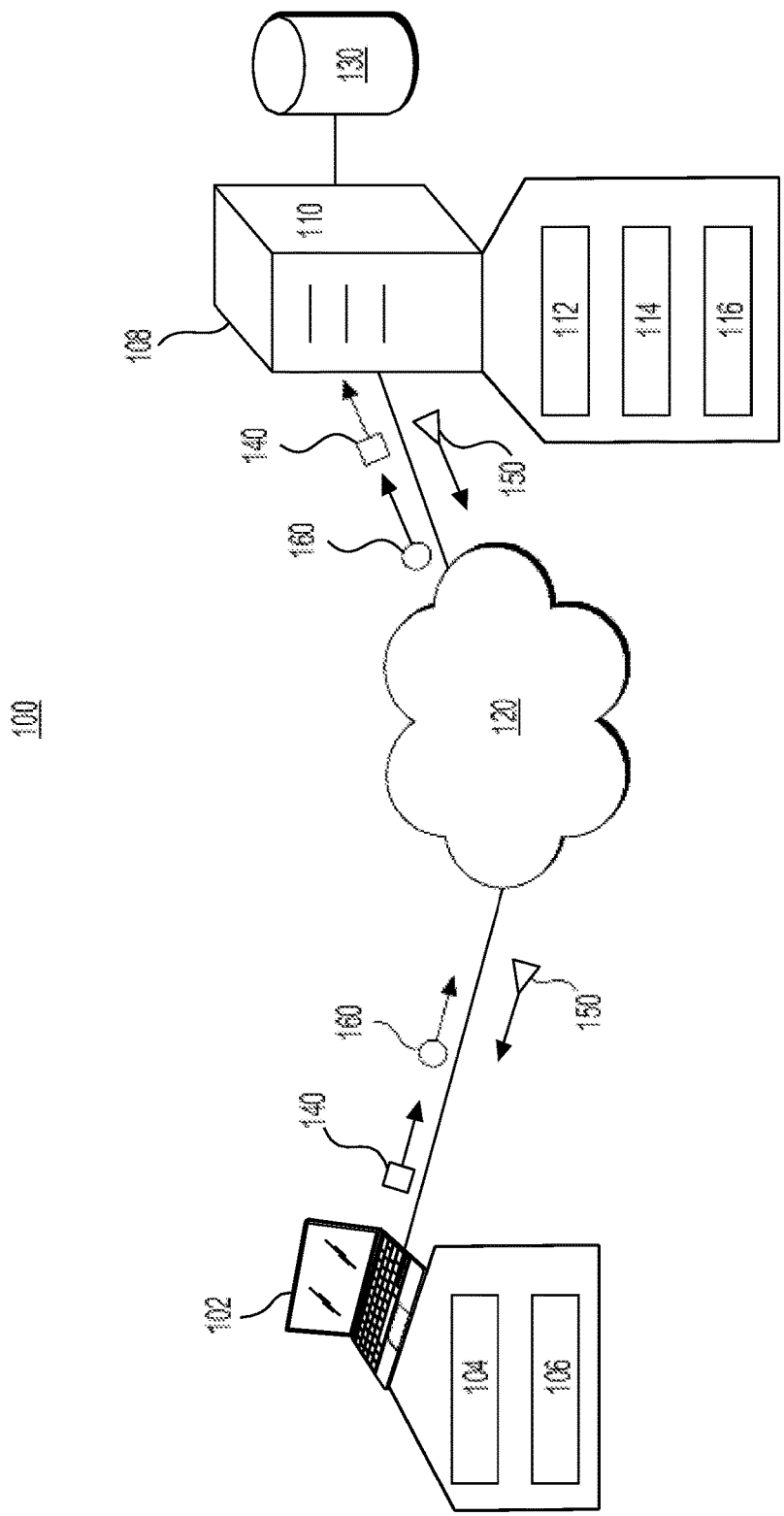
FIG. 1 depicts a block diagram of a system implemented in accordance with non-limiting embodiments of the present technology.

FIG. 1 schematically depicts a system 100. It is to be expressly understood that the system 100 is merely one possible implementation of the present technology. Thus, the description thereof that follows is intended to be only a description of illustrative examples of the present technology. This description is not intended to define the scope or set forth the bounds of the present technology. Certain cases that are believed to be helpful examples of modifications to the system 100 may also be set forth below.

This is done merely as an aid to understanding, and, again, not to define the scope or set forth the bounds of the present technology. These modifications are not an exhaustive list, and, as a person skilled in the art would understand, other modifications are likely possible. Further, where no examples of modifications have been set forth, it should not be interpreted that no modifications are possible and/or that what is described is the sole manner of implementing that element of the present technology. As a person skilled in the art would understand, this is likely not the case. In addition it is to be understood that the system 100 may provide in certain instances a simple implementation of the present technology, and that where such is the case they have been presented in this manner as an aid to understanding. As persons skilled in the art would understand, various implementations of the present technology may be of a greater complexity.

FIG. 1 depicts the system 100 implemented in accordance with one non-limiting embodiment of the present technology. The system 100 comprises a client device 102. The client device 102 is typically associated with a user (not depicted) and, as such, can sometimes be referred to as a "user device". It should be noted that the fact that the client device 102 is associated with the user does not need to suggest or imply any mode of operation—such as a need to log in, a need to be registered or the like.

The implementations of the client device 102 are not particularly limited, but as an example, the client device 102 may be implemented as a personal computer (a desktop, a laptops, a netbook, etc.) or a wireless electronic device (a cell phone, a smartphone, a tablet and the like). The general implementation of the client device 102 is known in the art and, as such, will not be described here at much length. Suffice it to say that the client device 102 comprises a user input interface (such as a keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over a communications network 120; and a processor coupled to the user input interface, the user output interface and the network communication interface, the processor being configured to execute various routines, including those described herein below. To that end the processor may store or have access to computer readable instructions which instructions, when executed, cause the processor to execute the various routines described herein.

As an illustrative example in FIG. 1, the client device 102 is a laptop. The client device 102 comprises hardware and/or software and/or firmware (or a combination thereof), to execute a client application 104 and a browser application 106. Generally, the client application 104 is configured to access an electronic service for transmission of digital objects through at least one native network protocol. Non-limiting examples of the client application 104 for accessing the electronic service for transmission of digital objects are: email applications (for example, Microsoft Outlook™, Mozilla Thunderbird™, and The Bat!™), instant messaging applications (Google Talk, ICQ, and WhatsApp), personal cloud storage applications (Microsoft OneDrive, Dropbox, and Yandex.Disk).

Generally, the browser application 106 is designed to retrieve, provide and browse various information resources, and as an example, for accessing web interfaces of electronic services for transmission of digital objects. Non-limiting examples of the browser application 106 are: Microsoft™ Internet Explorer™, Mozilla Firefox™, Safari™, Google™ Chrome™, Yandex.Browser™, etc. The browser application 106 may be a standalone application or part of another application that allows for browsing web content on the client device 102. Furthermore, the client application 104 is configured to trigger execution of the browser application 106, for example, in order to access a web resource or execute a verification routine, as will be described in greater detail herein below.

The system 100 comprises the communications network 120. In some non-limiting embodiments of the present technology, the communication network 120 can be implemented as the Internet. In other embodiments of the present technology, the communications network 120 can be implemented differently, such as any wide-area communications network, local-area communications network, a private communications network and the like.

The client device 102 is communicatively coupled to the communication network 120 via a communication link (not numbered). How the communication link is implemented is not particularly limited and will depend on how the client device 102 is implemented.

For example, the client device 102 is implemented, in this case, as a laptop, the first communication link can be either wireless (such as the Wireless Fidelity, or WiFi® for short, Bluetooth® or the like) or wired (such as an Ethernet™ based connection).

As another example, a client device may be a smartphone and, as such, the second communication link can be wireless—such as the Wireless Fidelity, or WiFi® for short, Bluetooth® or the like or cellular (such as 3G, LTE and the like).

The system 100 further comprises a server 108 coupled to the communications network 120 via a communication link (not separately numbered). The server 108 may be implemented as a conventional computer server. In an example of an embodiment of the present technology, the server 108 may be implemented as a Dell™ PowerEdge™ Server running the Microsoft™ Windows Server™ operating system. Needless to say, the server 108 may be implemented in any other suitable hardware and/or software and/or firmware or a combination thereof. In the depicted non-limiting embodiment of present technology, the server 108 is a single server. In alternative non-limiting embodiments of the present technology, the functionality of the server 108 may be distributed and may be implemented via multiple servers. Given the above examples of the client application 104 which may be implemented as an email application, an instant messaging application or a personal cloud storage application, the server 108 may be implemented as an email server, an instant messaging server or a personal cloud storage server, respectively. In one possible embodiment of the present technology, the server 108 can be configured to combine several purposes.

The implementation of the server 108 is well known. However, briefly speaking, the server 108 comprises a communication interface (not depicted) structured and configured to communicate with various entities (such as the client device 102 and other devices potentially coupled to the communication network 120) via the communication network 120 and a processor 110 functionally connected to a communications interface adjusted and configured to execute various processes described herein. Further, according to another non-limiting embodiment of the present technology, the server 108 can comprise one or more of: a client access module 112, an access control module 114 and a verification module 116. In another non-limiting embodiment of the present technology, the server 108 comprises the client access module 112 and configured to access the access control module 114 and the verification module 116 located on at least one different server (not shown).

Generally speaking, each or at least one of the aforementioned modules (the client access module 112, the access control module 114 and the verification module 116) can be implemented as a physical device, hardware device or a plurality of modules implemented with the use of hardware, for example, an application-specific integrated circuit (ASIC) or a field-programmable gate array (FPGA) or a combination of hardware and software, for example with the use of a microprocessor system and a set of instructions implementing the module functionality which (when executed) transform the microprocessor system into an special-purpose device. Each or at least one of the aforementioned modules can also be implemented as a combination of hardware and software, certain particular functions to be implemented through such hardware and the other to be implemented through a combination of such hardware and software.

In other embodiments of the present technology, each or at least one of the aforementioned modules can also be implemented as software to be executed by various types of processors. For example, any such module can comprise one or more physical or logical blocks of computer instructions that can be arranged, for example, as an object, a procedure or a function. However, such executable modules do not have to be physically located together and can comprise various instructions stored in different places, which, when logically connected to one another, include such module and perform the task specified for such module.

The client device 102, when executing the client application 104, is configured to generate a request 140 for accessing to the user profile in an electronic service for transmission of digital objects. The request 140 includes the user account data and at least one user behavior parameter. Such account data can be, for example, a combination of a login and a password. The user behavior parameter can, for instance, be one or more of: a network address, geolocation data related to the current location of the client device 102; a version of the operating system of the client device 102; the time of the request, and a version of the client application 104.

The client device 102, when executing the client application 104, is configured to send the request 140 via the communication network 120 through the native network protocol of the client application 104. The native network protocol is one or more network protocols used by the client application 104 to transmit and/or receive digital objects. Non-limiting examples of native protocols are: POP3, SMTP, and IMAP—for email applications; XMPP—for instant messaging applications, and WebDav, FTP, SSH, RSync, SCP, SFTP, and FTPS—for personal cloud storage applications. For example, when the client application is an email application, the request 140 can be sent to the server 108 via the communication network 120 through the SMTP native network protocol.

The server 108 is configured to receive, via the processor 110 and the client access module 112, a request 140 for access to the user profile in an electronic service for transmission of digital objects via the communication network 120. The server 108 is further configured to retrieve, through the processor 110 and the client access module 112, the user account data and at least one user behavior parameter from the request 140.

In another embodiment of the present technology, the request 140 comprises the user account data only, the server 108 being capable of retrieving at least one user behavior parameter upon receipt of the request 140 (for example, from the request 140). For example, the server 108 can retrieve the network address from which the request 140 was received and the time of the request.

The server 108 is configured to transmit the user account data and at least one user behavior parameter so received to the access control module 114 The access control module 114 has access to at least one database 130 containing the profiles of registered users, each such profile comprising the user account data and the user behavior parameters obtained on the basis of a plurality of prior user interactions. The access control module 114 is configured to, responsive to receipt of the registered user account data and at least one user behavior parameter, retrieve the profile of such registered user from the database 130. The access control module 114 is configured to compare at least one user behavior parameter contained in the received request with the user behavior parameters stored in the user profile in the database 130 on the basis of a plurality of prior user interactions.

In one embodiment of the present technology, the user behavior parameter stored in the user profile is at least one of: a network address regularly used to access the service; geolocation data related to the usual/primary location of the user device at the time of access to the electronic service; a version of the operating system of the client device 102 at the time of access to the electronic service; the user's typical service access time pattern. Alternatively or additionally, the user behavior parameter can be a numeric value generated based on a plurality of the user behavior parameters, each with a preliminarily assigned respective weight coefficient.

Responsive to the user behavior parameter extracted from the received request 140 matching one of the user behavior parameters stored in the user profile (the user behavior parameters stored in the user profile having been generated on the basis of a plurality of the user interactions), the access control module 114 is configured to transmit instructions to the client access module 112 to grant access to the user profile in an electronic service for transmission of digital objects through the client application 104 of the client device 102 from which the request 140 for access to the user profile in the electronic service for transmission of digital objects was received.

Responsive to at least one user behavior parameter from the received request 140 failing to match any of the user behavior parameters stored in the user profile, the access control module 114 is configured to transmit instructions to the verification module 116 to create a verification routine associated with the user profile. Furthermore, the access control module 114 is configured to transmit indications of the verification routine to the client access module 112.

The type of the verification routine associated with the user profile is not particularly limited. In non-limiting embodiments of the present technology, a verification routine can be a security question, the answer to which was inputted by the user (for example, mother's maiden surname, pet's name, favorite movie, etc.). In a non-limiting embodiment of the present technology, a verification routine can be a security question generated by the system on the basis of a plurality of user interactions (for example, if the service is an instant messaging service or an email service—the addressee of the last outgoing message, or, for example, if the service is a personal cloud storage service—the name of the last uploaded file). In a non-limiting embodiment of the present technology, a verification routine can be a control action, for example, inputting a secret code generated by the system and sent to the mobile phone associated with the user. The above verification routine examples are illustrative and do not limit the scope of the present technology.

The client access module 112 is configured to transmit a digital object 150 with an indication of the verification routine to the client application 104 installed on the client device 102 through the native network protocol used by the client device 102. In one embodiment of the present technology, native protocols used to send the request 140 and to receive the digital object 150 can be the same or different. For example, when the electronic service for transmission of digital objects is an instant messaging service, a single native network protocol (for example, XMPP) can be used as a native protocol to send the request 140 and as a native network protocol to receive the digital object 150. When the electronic service for transmission of digital objects is an email service, one native network protocol (for example, SMTP) can be used to send the request 140 and another native network protocol (for example, IMAP or POPS) can be used to receive the digital object 150. As another example, when the electronic service for transmission of digital objects is a personal cloud storage service, a single native network protocol or several native network protocols (for example, any of WebDav, or FTP, or SSH, RSync, or SCP, or SFTP or FTPS) can be used as the native protocol to send the request 140 and as the native network protocol to receive the digital object 150.

In one embodiment of the present technology, an indication of the verification routine is a pointer, a reference, a link, or another indirect mechanism enabling the recipient of the indication to gain access to such verification routine. In one embodiment of the present technology, an indication of the verification routine is a link to such verification routine available to the client device 102 through at least one non-native network protocol. In one non-limiting embodiment of the present technology, the electronic service for transmission of digital objects is also available to the user through a web interface and the verification routine indication is a link to such verification routine executable via the web interface of the electronic service, such indication configured to cause the client device 102 to perform the verification routine via at least one non-native network rather than via the native network protocol.

In another non-limiting embodiment of the present technology, the indication of the verification routine can be the verification routine itself.

The digital object 150 with an indication of a verification routine transmitted to the client application 104 installed on the client device 102 can be, for example, an instant message with an indication of such verification routine (in the case of an electronic instant messaging service), an email containing an indication of such verification routine (in the case of an email service), or a file with an indication of such verification routine (in the case of a personal cloud storage service).

In some non-limiting embodiments of the present technology, in order to confirm the verification routine, the server 108 is configured to create a pseudo-profile of the user and to grant access for the client application 104 installed on the client device 102 to the user pseudo-profile. The user pseudo-profile is an abbreviated version of the user profile where at least part of (or the entirety of) the user profile data is hidden. Therefore, if the authentication data (for example, login and password) are correct, but the user behavior parameter contained in the request 140 differs from the behavior parameters contained in the user profile, such user will gain access to the pseudo-profile in the client application 104 installed on the client device 102. Responsive to the digital object 150 with an indication of the verification routine having been transmitted, the client application 104 is configured to grant access to the digital object 150 with an indication of the verification routine in the user pseudo-profile. In one non-limiting embodiment of the present technology, the digital objects of the user profile in the electronic service are hidden in the user pseudo-profile. For example, when the electronic service for transmission of digital objects is an instant messaging service, no messages, other than message(s) with a link to a verification routine, will be available (be displayed in the user output interface) in the user pseudo-profile. When the electronic service for transmission of digital objects is an email service, only message(s) with a link to a verification routine will be available (displayed) in the inbox folder in the user pseudo-profile. When the electronic service for transmission of digital objects is a personal cloud storage service, only the file(s) with a link to a verification routine will be displayed in the user pseudo-profile, whereas the files from the user profile will be hidden.

In one non-limiting embodiment of the present technology, at least some of the digital objects of the user profile in the electronic service for transmission of digital objects are hidden in the user pseudo-profile. For example, only previously downloaded digital objects are available (displayed) in the user pseudo-profile, whereas new digital objects available in the user profile are hidden. Only the digital object 150 is displayed as a new digital object. For example, when the electronic service for transmission of digital objects is an email service, only previously downloaded (old) email messages will be available in the user pseudo-profile, whereas any new email messages (not downloaded previously) received by the email server will not be displayed. The digital object 150 (an email with an indication of a verification routine) will be displayed as a new message in the user pseudo-profile.

The client application 104 installed on the client device 102 is configured to receive the digital object 150 with an indication of a verification routine.

The verification module 116 is configured to grant access for the client device 102 to the verification routine associated with the user profile via the indication of the verification routine through a non-native network protocol. It should be noted that in this context, a non-native protocol means any other protocol that is not used by the client application 104 for purposes of exchanging digital objects with the electronic service for transmission of digital objects Non-native protocols can also be supported by the client application 104 for purposes of performing other tasks, or require triggering a different application, for example, the browser application 106 installed on the client device 102. In the context of the present technology, non-limiting examples of non-native protocols are the HTTP and HTTPS network protocols.

The client device 102 is configured to access, and send data in respect of the performance of, the verification routine 160 to the verification module 116 through the non-native network protocol via the communication network 120. Upon receipt of the digital object 150 with an indication of the verification routine, a user of the client device 102 can initiate connection to the verification module 116 and transmission of data in respect of the performance of the verification routine 160. Verification routine 160 performance data are not particularly limited and will depend on the nature of the verification routine created by the verification module 116. In one non-limiting embodiment of the present technology, the verification routine 160 performance data can be a response to at least one security question. Such response is inputted by the user of the client device 102 through an input interface of the client device 102. In a non-limiting embodiment of the present technology, the verification routine 160 performance data can be a control action, for example, inputting a secret code generated by the verification module 116 and sent to a mobile phone associated with the user. The above verification routine 160 performance data examples are illustrative and do not limit the scope of the present technology.

For example, when the digital object 150 with an indication of a verification routine is an email message containing a link to such verification routine in the web interface of an electronic service for transmission of digital objects, a non-limiting embodiment of the present technology provides for the user of the client device 102 to click the link that triggers the browser application 106. A window of the browser application 106 displays the verification routine page. Once the user performs, through the input interface of the client device 102, the verification routine, the verification routine 160 performance data is transmitted to the verification module 116 via the communication network 120 using a non-native network protocol (for example, HTTP or HTTPS). Similarly, the above applies to cases when the digital object 150 with an indication of a verification routine is an instant message with a link or a file with a link to a verification routine.

It should be noted that a non-native network protocol (for example, HTTP or HTTPS) allows performing a far larger range of verification routines as compared to the native network protocols (such as POP3, SMTP, or IMAP). For example, when the electronic service for transmission of digital objects is an email service and the digital object 150 with an indication of a verification routine is an email message, then a verification routine accessible through the non-native network protocol can include, for example, verification routines based on video, images, sounds, interactive animation and/or any combination thereof, etc. Also, verification routine 160 performance data in a non-native protocol can include mouse cursor movements, choice of various elements in the web interface, etc. It is impossible or impractical to perform at least some of the above routines using the native network protocols (POP3, SMTP, IMAP) used by client email applications, and it is difficult to perform a comprehensive verification routine that includes a number of various verification approaches.

In another possible embodiment of the present technology, an indication of the verification routine is the verification routine itself. The verification module 116 is configured to receive the verification routine 160 performance data in the form of a request through a native network protocol. Such verification routine 160 performance data can be transmitted to the verification module 116 by the client application 104 installed on the client device 102 via the client access module 112.

For example, when the digital object 150 with the indication of the verification routine is an email message containing a secret question, then the verification routine 160 can be performed in the form of a reply email containing a response to such question inputted by the user through the input interface of the client device 102, which reply email is sent via the client application 104 through a native network protocol (SMTP, IMAP, POP3). Similarly, when the digital object 150 with an indication of the verification routine is an instant message containing a secret question, then the verification routine 160 can be performed in the form of a reply instant message containing a response to such question inputted by the user through the input interface of the client device 102, which reply message is sent via the client application 104 through the XMPP native network protocol. An advantage of this embodiment is faster verification routine performance since there is no need for triggering the browser application 106 and switching, as indicted, to a web interface via a non-native network protocol (HTTP, HTTPS) in order to perform the respective verification routine.

The verification module 116 is configured to receive and verify the verification routine 160 performance data received from the client device 102. Responsive to such verification routine having been confirmed, the verification module 116 is configured to send the respective confirmation to the access control module 114. No specific limitations exist as to how exactly verification routine 160 performance data is to be verified. Generally, the verification module 116 is configured to compare the received verification routine 160 performance data with the respective security answer.

In one possible embodiment of the present technology, responsive to the verification routine having been confirmed, the verification module 116 executes storing the user behavior parameter received in the request for access into the user profile through the access control module 114 in the database 130.

Responsive to the verification routine having been confirmed, the access control module 114 is configured to transmit instructions to the client access module 112 to grant access to the user profile in the electronic service for transmission of digital objects via the client application 104 installed on the client device 102 from which the request for access to the user profile in the electronic service for transmission of digital objects was received.

In one non-limiting embodiment of the present technology, responsive to an absence of a confirmation of the verification routine, the access control module 114 blocks access to the user profile through the client application 104 in the electronic service for data transmission. If an incorrect or no verification routine was performed within a given time frame (for example, 30 minutes, 1 hour, 5 minutes, etc.), following transmittal of the digital object 150 with an indication of the verification routine, access to the user profile via the client application 104 can be blocked in order to prevent any attempts of unauthorized access. At the same time, when a service for transmission of digital objects is also available to the user through a web interface, in one possible embodiment of the present technology, access to such service for transmission of digital objects through such web interface is not blocked even if the same is blocked through the client application.

In one non-limiting embodiment of the present technology, responsive to an absence of a confirmation of the verification routine, the access control module 114 is configured to transmit instructions to the verification module 116 to create an additional verification routine associated with the user profile. Furthermore, the access control module 114 is configured to transmit indications of such additional verification routine to the client access module 112. In its turn, the client access module 112 is configured to transmit an additional digital object (not shown) through a native network protocol to the client application 104 used for sending the request for access to the user profile.

Such additional digital object (not shown) with an indication of the additional verification routine can be implemented similarly to the digital object 150. Transmittal of such additional digital object to the client application 104 installed on the client device 102 and receipt of additional verification routine performance data (not shown) can be performed in the same way as described for the digital object 150 and verification routine 160 performance data.

Figure 2:
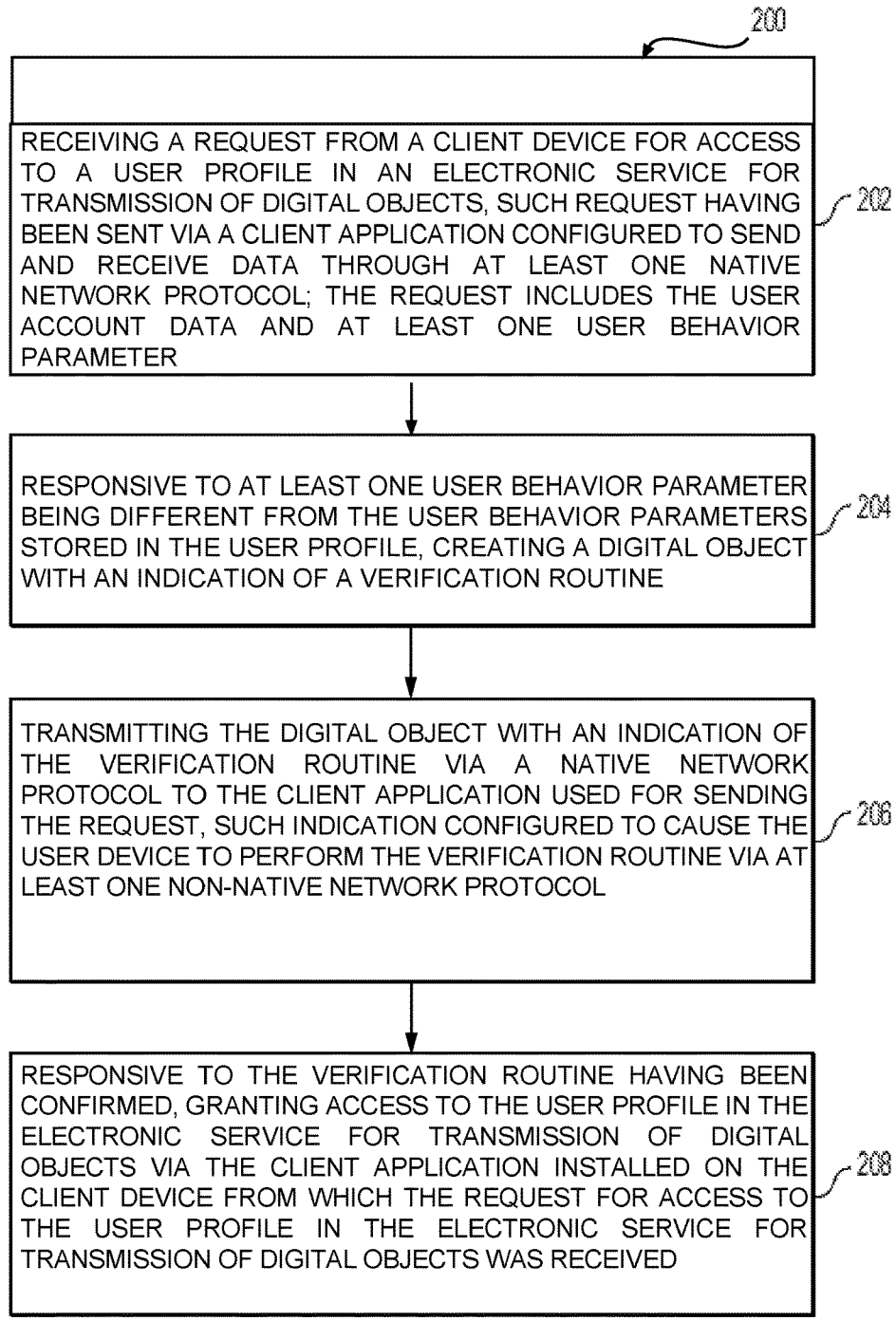
FIG. 2 depicts a flow chart of a method of user authentication in an electronic service for transmission of digital objects implemented in accordance with non-limiting embodiments of the present technology.

Given the architecture described above, it is possible to execute a method of user authentication in an electronic service for transmission of digital objects hosted on a server, such electronic service for transmission of digital objects being available to the user through a client application executable on a client device 102, the client device 102 being configured to gain access to such server over a communication network 120. FIG. 2 depicts a block diagram of a method 200 being executed in accordance with non-limiting embodiments of the present technology. The method 200 can be executed by the server 108 and, more specifically, by the processor 110 of the server 108.

Step 202—receiving, by the server from the client device, a request for access to a user profile in the electronic service, the request having been generated by the client application; the request including user account data and at least one user behavior parameter;

The method 200 starts at the step 202 where the server 108 receives a request 140 from the client device 102 for access to the user profile in an electronic service for transmission of digital objects, the request 140 having been sent via the client application 104 installed on the client device 102 capable of sending and receiving data using at least one native network protocol. The request 140 includes the user account data and at least one user behavior parameter.

The request 140 can contain user authentication data, for example, a login and a password to enter an electronic service for transmission of digital objects. Along with the request 140, at least one user behavior parameter is received. The user behavior parameter can, for instance, be one or more of: a network address, geolocation data related to the current location of the client device; a version of the operating system of the client device; the time of the request, and a version of the client application 104.

Prior to executing the step 202, the processor 110 generates a user profile, the user profile including the user account data and behavior parameters obtained on the basis of a typical pattern of the user past interactions with the electronic service, the user profile having been stored in the database 130. The user behavior parameter stored in the user profile is at least one of: a network address typically used to access the electronic service; geolocation data related to the typical location of the user device at the time of access to the electronic service; a version of the operating system of the user device at the time of access to the electronic service; the user's typical electronic service access time pattern.

In one embodiment of the method, responsive to the request 140 for access to a user profile, the processor 110 via the access control module 114 retrieves the user's profile from the database 130 and compares at least one user behavior parameter contained in the request 140 so received with the user behavior parameters stored in the user profile.

Further, the method proceeds to step 204.

Step 204—responsive to at least one user behavior parameter being different from the user behavior parameters stored in the user profile, creating a digital object with an indication of a verification routine At step 204, the processor 110, responsive to at least one user behavior parameter being different from the user behavior parameters stored in the user profile, creates a digital object with an indication of a verification routine.

The method 200 then proceeds to step 206.

Step 206—transmitting the digital object via a native network protocol to the client application used for sending the request, the digital object configured to cause the user device to perform the verification routine via at least one non-native network protocol;

At step 206, the processor 110, via the client access module 112, transmits the digital object 150 with an indication of a verification routine through the communication network 120 to the client application 104 used for sending the request 140 for access to the user profile.

The verification routine is performed through at least one non-native network protocol in a different application, The server 108 receives verification routine 160 performance data via the verification module 116 from the client device 102 using at least one non-native network protocol. The verification routine 160 performance data is sent via the client application 104 through the communication network 120.

In some non-limiting embodiments of the method 200, performing the verification routine through at least one non-native network protocol is executed in a different application from the client application 104. In a specific non-limiting embodiment of the method 200, the different application is the browser application 106. In one non-limiting embodiment of the method 200, the non-native network protocol is either: HTTP or HTTPS.

In one non-limiting embodiment of the method 200, the electronic service for transmission of digital objects is also available to the user through a web interface and the verification routine indication comprises a link to the verification routine in the web interface of the service for transmission of digital objects.

In one non-limiting embodiment of the method 200, the electronic service for transmission of digital objects is an instant messaging service, the native network protocol being XMPP.

In yet another non-limiting embodiment of the method 200, the electronic service for data transmission is an email service, the native network protocol being at least one of: POPS, or SMTP, or IMAP.

In one non-limiting embodiment of the method 200, the electronic service for data transmission is a personal cloud storage, the native network protocol being at least one of: WebDav, or FTP, or SSH, RSync, or SCP, or SFTP or FTPS.

The method 200 then proceeds to step 208.

Step 206—responsive to the verification routine having been confirmed, granting access to the user profile in the electronic service for transmission of digital objects via the client application installed on the client device from which the request for access to the user profile in the electronic service for transmission of digital objects was received At step 208, the processor 110 of the server 108, through the verification module 116, verifies verification routine 160 performance data. Responsive to the verification routine having been confirmed, the processor 110, via the access control module 114 of the client access module 112 grants access to the user profile in the electronic service for transmission of digital objects through the client application 104 installed on the client device 102 from which the request 140 for access to the user profile in the electronic service for transmission of digital objects was received.

In one non-limiting embodiment of the method 200, responsive to the verification routine having been confirmed, the method 200 further comprises storing the user behavior parameter received in the request for access into the user profile in the database 130.

In one non-limiting embodiment of the method 200, responsive to an absence of a confirmation of the verification routine, the method 200 further comprises creating an additional digital object with an indication of an additional verification routine and transmitting the additional digital object using the native network protocol to the client application 104 used for sending the request for access to the user profile.

In one non-limiting embodiment of the method 200, responsive to an absence of a confirmation of the verification routine, the method 200 further comprises blocking access to the user profile through the client application in the electronic service for data transmission.

In one non-limiting embodiment of the method 200, prior to any confirmation of the verification routine, the method 200 further comprises creating a pseudo-profile of the user and granting access to such user pseudo-profile in the client application 104.

In one non-limiting embodiment of the method 200, after transmitting the digital object with an indication of the verification routine to the client application 104 using the native network protocol, the method 200 further comprises initiating display of the digital object with an indication of the verification routine in the user pseudo-profile.

In one non-limiting embodiment of the method 200, at least some of the digital objects of the user profile in the electronic service for transmission of digital objects are hidden in the user pseudo-profile.

In one non-limiting embodiment of the method, all of the digital objects of the user profile (other than the digital object containing the verification routine) in the electronic service for transmission of digital objects are hidden in the user pseudo-profile.

The method 200 can then terminate or return to executing step 202.

Figure 3:
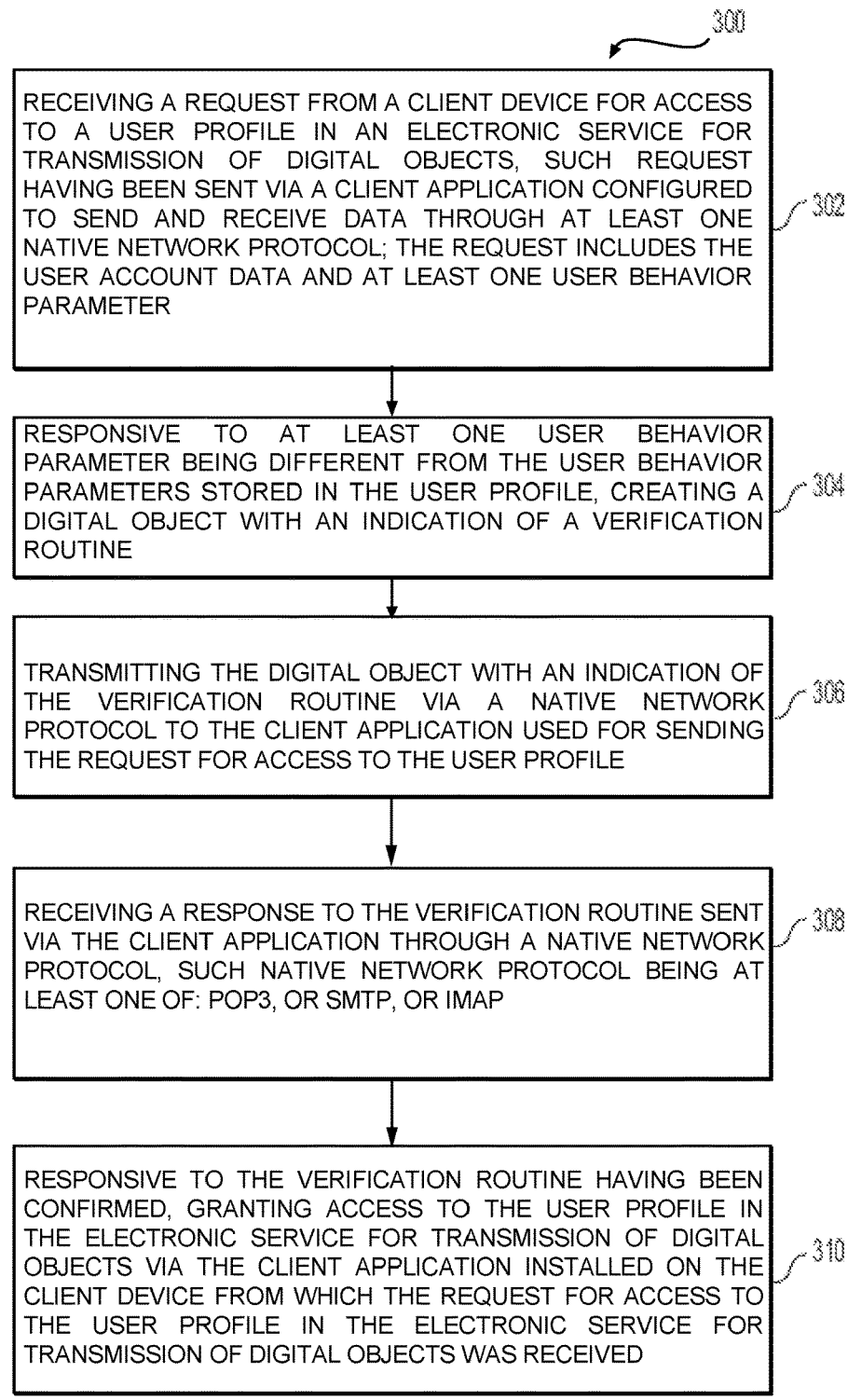
FIG. 3 depicts a flow chart of a method of user authentication implemented in accordance with other non-limiting embodiments of the present technology.

Given the architecture described above, it is possible to execute a method of user authentication in an electronic service for transmission of digital objects hosted on a server, such electronic service for transmission of digital objects being available to the user through a client application executable on a client device 102, the client device 102 being configured to gain access to such server over a communication network 120. The client device 102 is configured to communicate using a native protocol, the native protocol being at least on of: POP3, or SMTP, or IMAP. FIG. 3 depicts a block diagram of a method 300 being executed in accordance with other non-limiting embodiments of the present technology. The method 200 can be executed by the server 108 and, more specifically, by the processor 110 of the server 108.

Step 302—receiving, by the server from the client device, a request for access to a user profile in the electronic service, the request having been generated by the client application; the request including user account data and at least one user behavior parameter The method 300 starts at the step 302, where the server 108 receives a request 140 from the client device 102 for access to the user profile in an electronic service for transmission of digital objects, such request 140 having been sent via the client application 104 installed on the client device 102 capable of sending and receiving data through at least one native network protocol. The request 140 includes the user account data and at least one user behavior parameter.

The request 140 can include user authentication data, for example, a login and a password to enter the electronic service for transmission of digital objects. Along with the request 140, at least one user behavior parameter is received. The user behavior parameter can, for instance, be one or more of: a network address, geolocation data related to the current location of the client device; a version of the operating system of the client device; the time of the request, and a version of the client application 104.

Prior to step 302, a user profile is generated. The user profile includes the user account data and behavior parameters obtained on the basis of a plurality of the user past interactions with the electronic service, the user profile having been stored in the database 130. The user behavior parameter stored in the user profile is at least one of: a network address typically used to access the service; geolocation data related to the typical location of the client device 102 at the time of access to the electronic service; a version of the operating system of the user device at the time of access to the electronic service; the user's typical access time pattern for the electronic service.

In one non-limiting embodiment of the method 300, responsive to the request 140 for access to a user profile, the processor 110 retrieves, via the access control module 114, the user profile from the database 130 and compares at least one user behavior parameter contained in the request 140 so received with the user behavior parameters stored in the user profile.

Further, the method proceeds to step 304.

Step 304—responsive to at least one user behavior parameter being different from the user behavior parameters stored in the user profile, creating a digital object with an indication of a verification routine;

At step 304, the processor 110, responsive to at least one user behavior parameter being different from the user behavior parameters stored in the user profile, creates a digital object with an indication of a verification routine.

The method 300 then proceeds to step 306.

Step 306—transmitting the digital object with an indication of a verification routine via a native network protocol to the client application At step 306, the processor 110, via the client access module 112, transmits the digital object 150 with an indication of a verification routine through the communication network 120 to the client application 104 used for sending the request 140 for access to the user profile.

The method 300 then proceeds to step 308.

Step 308—receiving a response to a verification routine sent via the client application through the native network protocol At step 308, the processor 110, via the client access module 112 and the verification module 116, receives a response to the verification routine sent via the client application 104 through a native network protocol, such native network protocol being at least one of: POP3, or SMTP, or IMAP.

The method 300 then proceeds to step 310.

Step 310—responsive to the verification routine having been confirmed, granting access to the user profile in the electronic service via the client application installed on the client device from which the request for access to the user profile in the electronic service for transmission of digital objects was received At step 310, the processor 110 of the server 108 verifies, through the verification module 116, the response to the verification routine Responsive to the verification routine having been confirmed, the processor 110 grants, via the access control module 114 of the client access module 112, access to the user profile in the electronic service for transmission of digital objects through the client application 104 installed on the client device 102 from which the request 140 for access to the user profile in the electronic service for transmission of digital objects was received.

In one non-limiting embodiment of the method 300, responsive to an absence of a confirmation of the verification routine, the method 300 further comprises blocking access to the user profile through the client application 104 in the electronic service for data transmission.

In one non-limiting embodiment of the method 300, prior to any confirmation of the verification routine, the method 300 further comprises creating a pseudo-profile of the user and granting access to the user pseudo-profile in the client application 104.

In one non-limiting embodiment of the method 300, after transmitting the digital object with an indication of the verification routine to the client application 104 using the native network protocol, the method 300 further comprises initiating display of the digital object with an indication of the verification routine in the user pseudo-profile.

In one non-limiting embodiment of the method 300, at least some of the digital objects of the user profile in the electronic service for transmission of digital objects are hidden in the user pseudo-profile.

In one non-limiting embodiment of the method 300, all of the digital objects (other than the digital object containing the verification routine) of the user profile in the electronic service for transmission of digital objects are hidden in the user pseudo-profile.

Some of these steps and signal sending-receiving are well known in the art and, as such, have been omitted in certain portions of this description for the sake of simplicity. The signals can be sent-received using optical means (such as a fiber optic connection), electronic means (such as using wired or wireless connection), and mechanical means (such as pressure-based, temperature based or any other suitable physical parameter based).

Even though the aforementioned implementations has been described and shown with reference to particular steps performed in a particular order, it should be understood that these steps may be combined, sub-divided, or re-ordered without departing from the teachings of the present technical solution.

In this specification, the expression "receiving data" from a user shall be construed to include receipt of data from such user by an electronic or other device in the form of an electronic or other signal One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

It should be expressly understood that not all technical effects mentioned herein need to be enjoyed in each and every embodiment of the present technology. For example, embodiments of the present technology can be implemented without the user enjoying some of these technical effects, while other embodiments can be implemented with the user enjoying other technical effects or none at all.

Modifications and improvements to the above-described implementations of the present technology may become apparent to those skilled in the art. The scope of the present technology is therefore intended to be limited solely by the scope of the appended claims. The scope of the present technology is therefore intended to be limited solely by the scope of the appended claims.

The invention claimed is:

1. A method of user authentication in an electronic service, the electronic service for transmitting, via a communication network, digital objects from a server to a client device associated with a user, the electronic service executable by the server and configured to be accessed by the client device via a client application executable by the client device, the client application configured to transmit data using at least one native network protocol, the method comprising:

receiving, by the server from the client device, via the at least one native network protocol, a request for access to a user profile in the electronic service, the request having been generated by the client application; the request including user account data and at least one user behavior parameter;

responsive to at least one user behavior parameter being different from the user behavior parameters stored in the user profile, creating a digital object with an indication of a verification routine;

creating a user pseudo profile, the user pseudo profile being an abbreviated version of the user profile, the user pseudo profile including a portion of the user profile data that includes previously downloaded digital objects and the digital object with the indication of the verification routine;

granting access to the user pseudo profile via the at least one native network protocol to the client application used for sending the request;

the digital object with the indication of the verification routine accessible in the user pseudo profile being configured to cause the client device to perform the verification routine via at least one non-native network protocol;

responsive to the verification routine having been executed via the at least one non-native network protocol, rendering a positive outcome, granting access to the user profile in the electronic service for the client device.

2. The method of claim 1, wherein the verification routine is configured to be performed through at least one non-native network protocol in a different application, the different application being configured to communicate via at least one non-native protocol.

3. The method of claim 2, wherein the different application comprises a browser application.

4. The method of claim 1, wherein the user behavior parameter stored in the user profile comprises at least one of the following:
a network address regularly used to access the electronic service;
geolocation data related to a typical location of the client device when accessing the electronic service;
a version of an operating system of the client device accessing the electronic service;
user's typical service access time pattern.

5. The method of claim 1, wherein responsive to the request for access to the user profile, the method further comprises retrieving the user profile and comparing at least one user behavior parameter contained in the request with the user behavior parameters stored in the user profile, the user behaviour parameters stored in the user profile having been generated on the basis of a plurality of past user's interactions with the electronic service.

6. The method of claim 1, wherein the non-native network protocol is one of: HTTP or HTTPS.

7. The method of claim 1, wherein the electronic service is also accessible through a web interface and the digital object comprises a link to the verification routine, the link to be accessed by the web interface.

8. The method of claim 1, the method further comprising storing, in the user profile, the user behavior parameter received in the request for access.

9. The method of claim 1, wherein responsive to an absence of a confirmation of the verification routine, the method further comprises creating an additional digital object with an indication of an additional verification routine and transmitting the additional digital object through the native network protocol to the client device.

10. The method of claim 1, wherein responsive to an absence of a confirmation of the verification routine, the method further comprises blocking access to the user profile for the client device.

11. The method of claim 1, wherein the electronic service for transmission of digital objects comprises an instant messaging service, and wherein the native network protocol comprises XMPP.

12. The method of claim 1, wherein the electronic service for data transmission comprises an email service, and wherein the native network protocol comprises at least one of: POP3, or SMTP, or IMAP.

13. The method of claim 1, wherein the electronic service for data transmission comprises a personal cloud storage, and wherein the native network protocol comprises at least one of: WebDav, or FTP, or SSH, RSync, or SCP, or SFTP or FTPS.

14. The method of claim 1, wherein responsive to an absence of a confirmation of the verification routine, the method further comprises creating an additional digital object with an indication of an additional verification routine and transmitting the additional digital object through the native network protocol to the client, and wherein the method further comprises after transmitting the additional digital object: initiating display of the additional digital object with an indication of the additional verification routine in the client application in the user pseudo-profile.

15. The method of claim 1, wherein at least one digital object associated with the user profile in the electronic service is hidden in the user pseudo-profile.

16. A server for user authentication in a service for transmission of digital objects, the server comprising a processor, the processor executing an electronic service, the electronic service for transmitting, via a communication network, digital objects from the server to a client device associated with a user, the electronic service configured to be accessed by the client device via a client application executable by the client device, the client application configured to transmit data using at least one native network protocol, the processor is configured to:
receive from the client device, via the at least one native network protocol, a request for access to a user profile in the electronic service, the request having been generated by the client application; the request including user account data and at least one user behavior parameter;
responsive to at least one user behavior parameter being different from the user behavior parameters stored in the user profile, create a digital object with an indication of a verification routine;
create a user pseudo profile, the user pseudo profile being an abbreviated version of the user profile, the user pseudo profile including a portion of the user profile data that includes previously downloaded digital objects and the digital object with the indication of the verification routine;
grant access to the user pseudo profile via the at least one native network protocol to the client application used for sending the request;
the digital object with the indication of the verification routine accessible in the user pseudo profile being configured to cause the client device to perform the verification routine via at least one non-native network protocol;
responsive to the verification routine, having been executed via the at least one non-native network protocol, rendering a positive outcome, grant access to the user profile in the electronic service for the client device.

17. A method of user authentication in an electronic service, the electronic service for transmitting, via a communication network, digital objects from a server to a client device associated with a user, the electronic service executable by the server and configured to be accessed by the client device via a client application executable by the client device, the client application configured to transmit data using at least one native network protocol, the native network protocol being at least one of: POP3, or SMTP, or IMAP, or XMPP; the method comprising:

- receiving, by the server from the client device, via the at least one native network protocol, a request for access to a user profile in the electronic service, the request having been generated by the client application; the request including user account data and at least one user behavior parameter; responsive to at least one user behavior parameter being different from the user behavior parameters stored in the user profile, creating a digital object with an indication of a verification routine;
- creating a user pseudo profile, the user pseudo profile being an abbreviated version of the user profile, the user pseudo profile including a portion of the user profile data that includes previously downloaded digital objects and the digital object with the indication of the verification routine;
- granting access to the user pseudo profile via the at least one native network protocol to the client application used for sending the request;
  - the digital object with the indication of the verification routine accessible in the user pseudo profile being configured to cause the client device to perform the verification routine via at least one non-native network protocol;
- receiving a response to the verification routine sent via the client application through the at least one native network protocol;
- responsive to the verification routine, having been executed via the native network protocol, rendering a positive outcome, granting access to the user profile in the electronic service for the client device.

* * * * *